United States Patent
Miyazawa

(10) Patent No.: US 9,342,938 B2
(45) Date of Patent: May 17, 2016

(54) KEYLESS ENTRY DEVICE

(71) Applicant: ALPS ELECTRIC CO., LTD., Tokyo (JP)

(72) Inventor: Akira Miyazawa, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 14/681,780

(22) Filed: Apr. 8, 2015

(65) Prior Publication Data

US 2015/0325070 A1    Nov. 12, 2015

(30) Foreign Application Priority Data

May 9, 2014   (JP) .................................. 2014-098047

(51) Int. Cl.
*G07C 9/00* (2006.01)
*B60R 25/24* (2013.01)

(52) U.S. Cl.
CPC ............ *G07C 9/00309* (2013.01); *B60R 25/24* (2013.01); *G07C 2009/00769* (2013.01); *G07C 2209/63* (2013.01)

(58) Field of Classification Search
CPC ................. G07C 9/00309; G07C 2009/00769; B60R 25/24
See application file for complete search history.

(56) References Cited

U.S. PATENT DOCUMENTS

| 8,232,863 | B2 | 7/2012 | Nakajima et al. |
| 2011/0102139 | A1* | 5/2011 | Girard, III ............. H04L 63/102 340/5.61 |
| 2014/0354404 | A1* | 12/2014 | Lin ..................... G07C 9/00182 340/5.64 |

FOREIGN PATENT DOCUMENTS

JP    2010-181295    8/2010

* cited by examiner

*Primary Examiner* — Curtis Odom
(74) *Attorney, Agent, or Firm* — Beyer Law Group LLP

(57) ABSTRACT

A portable device acquires a signal of noise component data that is based on signal intensity of a signal received in an OFF time in which the portable device does not communicate with the vehicle-side device, and then transmits an information signal that is based on the noise component data, and a vehicle-side device transmits a measurement signal controlled based on the information signal, at a predetermined time period.

9 Claims, 5 Drawing Sheets

KEYLESS ENTRY DEVICE

CLAIM OF PRIORITY

This application claims benefit of Japanese Patent Application No. 2014-098047 filed on May 9, 2014, which is hereby incorporated by reference.

BACKGROUND OF THE INVENTION

1. Field of the Invention

The present invention relates to a keyless entry device that performs predetermined control such as locking and unlocking of doors or the like of a vehicle by performing communication between a vehicle-side device and a portable device.

2. Description of the Related Art

A keyless entry device in which wireless communication is performed between a vehicle-side device provided in a vehicle and a portable device carried by a user, and doors of the vehicle are locked or unlocked based on this communication has been proposed (for example, Japanese Unexamined Patent Application Publication No. 2010-181295). In the keyless entry device, the vehicle-side device includes a plurality of transmission antennas provided in various places in the vehicle, and the portable device calculates a distance from the vehicle-side device based on reception intensity of a signal transmitted from each transmission antenna of the vehicle-side device and performs control of locking and unlocking of the doors of the vehicle according to a result of the calculation.

However, in the keyless entry device of the related art, if a user carries other information devices such as a smartphone, the portable device may receive radio waves generated by the information device as noise, in addition to a signal transmitted from the vehicle-side device, and accuracy of a distance calculated from reception intensity may be degraded. Further, intensity of radio waves generated by the information device such as the smart phone often periodically varies, and it is difficult to exactly recognize the influence of the varying intensity.

SUMMARY OF THE INVENTION

The present invention provides a keyless entry device capable of accurately measuring a distance from a vehicle even when a user carries an information device, and performing predetermined control of the vehicle without a control error.

According to an aspect of the present invention, there is a provided a keyless entry device including a vehicle-side device which is provided on a vehicle side and which transmits a signal at a first frequency, and a portable device which is able to be carried by a user and transmits a signal at a second frequency, the vehicle-side device and the portable device performing communication with each other to perform predetermined control of the vehicle, in which the portable device acquires noise component data that is based on signal intensity of a signal received during an OFF time in which the portable device does not communicate with the vehicle-side device, and then transmits an information signal that is based on the noise component data, and the vehicle-side device transmits a measurement signal controlled based on the information signal, at a predetermined time period.

Since background noise is measured in the time OFF in which communication with the vehicle-side device is not performed, and the measurement signal is controlled using the information signal that is based on noise component data of the noise, it is possible to generate and transmit an optimal measurement signal corresponding to the background noise. Here, the OFF time includes a time in which the portable device does not communicate with the vehicle-side device, which occurs after a start-up signal or a measurement signal is received.

In the keyless entry device according to the aspect of the present invention, it is preferable that the portable device acquires the reception intensity of the measurement signal, and transmits a signal including any one of calculation data from data that is based on the reception intensity of the measurement signal and calculation data from data that is based on the reception intensity of the measurement signal and the noise component data, and the vehicle-side device performs predetermined control of the vehicle based on the calculation data.

Accordingly, it is possible to accurately perform predetermined control of the vehicle even when there is background noise.

In the keyless entry device according to the aspect of the present invention, it is preferable that it is determined whether signal intensity information included in the noise component data is equal to or greater a predetermined threshold value, and when the signal intensity information included in the noise component data is equal to or greater than the predetermined threshold value, the measurement signal is transmitted multiple times during one period in the predetermined time period.

In the keyless entry device according to the aspect of the present invention, it is preferable that it is determined whether the signal intensity information included in the noise component data is equal to or greater a predetermined threshold value, and when the signal intensity information included in the noise component data is equal to or greater than the predetermined threshold value, the measurement signal having a large signal width is transmitted.

By transmitting the measurement signal multiple times or transmitting a measurement signal having a large signal width, measurement at an average noise level is possible even when there is noise varying such that signal intensity periodically increases, such as LF noise generated in a smart phone or the like, and thus, it is possible to secure measurement accuracy of the distance data.

In the keyless entry device according to the aspect of the present invention, it is preferable that the portable device includes a triaxial antenna, and when the intensity of a signal received for one axis of the triaxial antenna is greater than and predetermined times or more the intensity of a signal of each of the two other axes at the time of acquisition of the noise component data, signal intensity data of the two axes having lower signal intensity is used as the noise component data.

Accordingly, even when only a signal of a specific axis is periodically increased as in LF noise of a display screen such as a smart phone or the like, data of the two axes other than such an axis is used, and thus, more average background noise can be measured. Accordingly, it is possible to improve the measurement accuracy.

In the keyless entry device according to the aspect of the present invention, it is preferable that the information signal includes the signal intensity information included in the noise component data, or information indicating whether the signal intensity information included in the noise component data is equal to or greater than a predetermined threshold value.

In the keyless entry device according to the aspect of the present invention, it is preferable that the portable device transmits a request signal to the vehicle-side device as a part or all of the information signal at the predetermined time period, and the vehicle-side device transmits the measurement signal each time the vehicle-side device receives the request signal.

In the keyless entry device according to the aspect of the present invention, it is preferable that the request signal is a signal requesting to transmit the measurement signal multiple times during one period of the predetermined time period or to transmit the measurement signal having a large signal width when the signal intensity of the noise component data is equal to or greater than a predetermined threshold value.

In the keyless entry device according to the aspect of the present invention, it is preferable that the first frequency is in a long wave region, and the second frequency is in a higher frequency region than the first frequency.

By transmitting the signal at the first frequency from the vehicle-side device and transmitting the signal at the second frequency which is higher than the first frequency from the mobile device, it is possible to suppress the influence of noise in a long wave region output from the information device.

According to the present invention, even when the user carries an information device, it is possible to accurately perform distance measurement by reliably recognizing the influence of noise, and thus, to accurately perform predetermined control of the vehicle.

DESCRIPTION OF THE PREFERRED EMBODIMENTS

Hereinafter, a keyless entry device according to an embodiment of the present invention will be described in detail with reference to the drawings.

Figure 1:
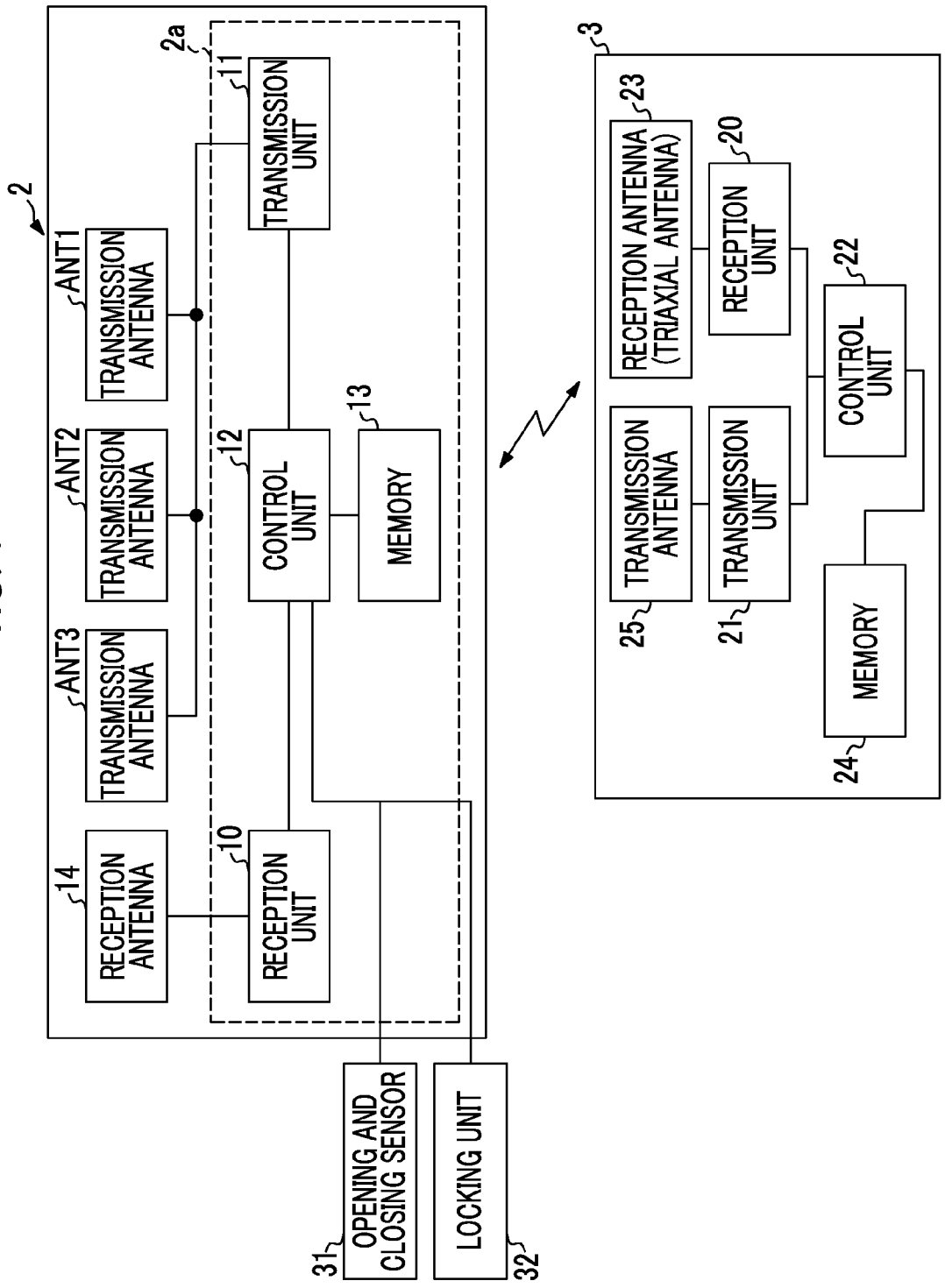
FIG. 1 is a block diagram illustrating a configuration of a keyless entry device according to an embodiment.
Figure 2:
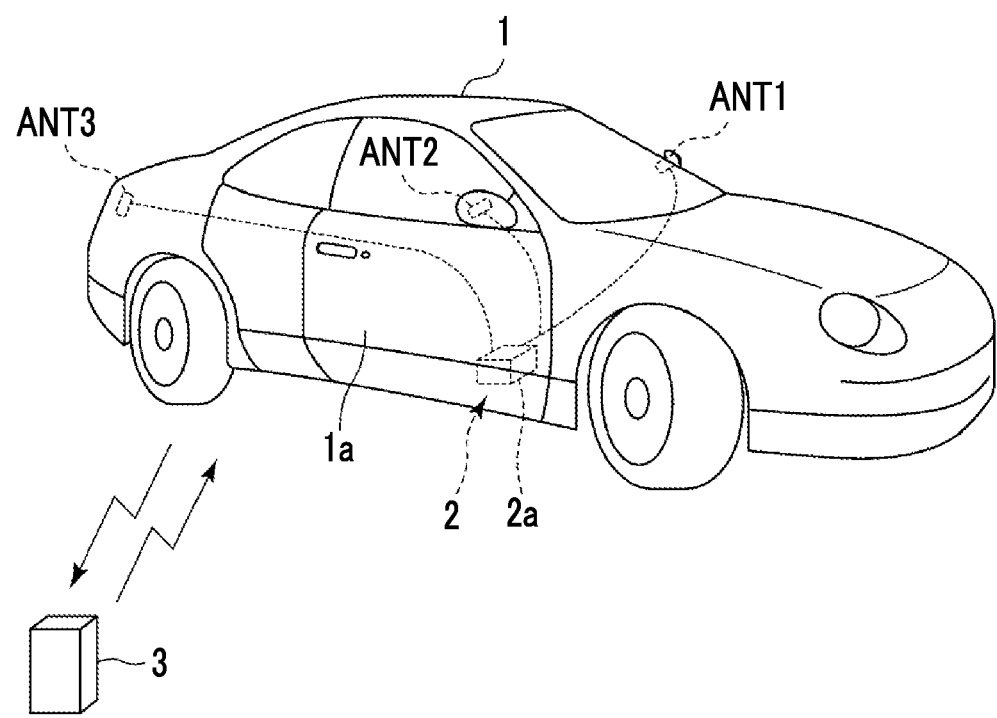
FIG. 2 is a perspective view illustrating a configuration of a vehicle-side device according to the embodiment.

FIG. 1 is a block diagram illustrating a configuration of a keyless entry device according to this embodiment, and FIG. 2 is a perspective view illustrating a configuration of a vehicle-side device according to this embodiment. In the keyless entry device according to this embodiment, a vehicle-side device 2 is provided on a vehicle 1 side, and performs wireless communication with a portable device 3 that can be carried by a user to perform predetermined control of the vehicle 1, such as locking and unlocking a door 1a.

The vehicle-side device 2 includes an electronic control unit 2a arranged in the vehicle 1, a plurality of transmission antennas ANT1 to ANT3 as a first transmission antenna, and a reception antenna 14. The electronic control unit 2a includes a vehicle-side reception unit 10 (reception unit), a vehicle-side transmission unit 11 (transmission unit), a vehicle-side control unit 12 (control unit), and a memory 13.

The vehicle-side reception unit 10 receives a signal of distance data that is based on the reception intensity of a signal such as an information signal transmitted from the portable device 3 or a measurement signal transmitted from the vehicle-side device 2. The vehicle-side transmission unit 11 transmits a signal (for example, a start-up signal or a measurement signal) to the portable device 3. The vehicle-side control unit 12 performs, for example, (1) control of an operation of the vehicle-side reception unit 10 and the vehicle-side transmission unit 11, (2) control of the measurement signal that is based on the information signal, and (3) predetermined control of the vehicle 1 such as locking and unlocking of the door 1a which is based on the distance data that is based on reception intensity of a measurement signal transmitted from the portable device 3.

Further, the vehicle-side control unit 12 is configured to receive information from an opening and closing sensor 31 that detects opening and closing of the door 1a. Further, a locking unit 32 that locks or unlocks the door 1a or a control unit thereof is connected to the vehicle-side control unit 12, and locking or unlocking of the door 1a can be controlled based on output information from the vehicle-side control unit 12.

The memory 13 stores, for example, a vehicle-specific ID, IDs of a plurality of portable devices capable of operating one vehicle, information which is necessary to perform the predetermined control of the vehicle 1 on the basis of data that is based on the reception intensity of the measurement signal data, and information regarding an interval of the signal transmitted from the vehicle-side device 2.

The plurality of transmission antennas ANT1 to ANT3 for transmitting a signal at a first frequency is connected to the vehicle-side transmission unit 11. The plurality of transmission antennas ANT1 to ANT3 are respectively provided in respective places in the vehicle 1, such as a plurality of doors or in the vicinity thereof. Here, the first frequency is preferably a low frequency (LF) in a long-wave region, such as 30 to 300 kHz, and a very low frequency region (VLF) may also be used. Also, the reception antenna 14 for receiving a signal transmitted from the portable device 3 is connected to the vehicle-side reception unit 10.

As illustrated in FIG. 1, the portable device 3 includes a portable device reception unit 20 (reception unit), a portable device transmission unit 21 (transmission unit), a portable device control unit 22 (control unit), a portable device reception antenna (triaxial antenna) 23, a portable device transmission antenna 25, and a memory 24.

The portable device reception unit 20 receives a signal such as a start-up signal or a measurement signal transmitted from the vehicle-side device 2. The portable device transmission unit 21 transmits a signal (for example, a signal of distance data calculated from the data that is based on the reception intensity of the measurement signal transmitted from the vehicle-side device 2 or information signal that is based on the noise component data) to the vehicle-side device 2. Here, the noise component data is data calculated based on signal intensity of a signal received in the OFF time in which communication with the vehicle-side device 2 is not performed. Further, the information signal includes the signal intensity information included in the noise component data, the information indicating whether the signal intensity information included in the noise component data is equal to or greater than a predetermined threshold value, or the request signal, and the request signal is transmitted as part a or all of the information signal.

The portable device control unit 22 controls the operation of the portable device reception unit 20 and the portable device transmission unit 21, and calculates the distance data that is based on the reception intensity of the measurement signal transmitted from the vehicle-side device 2. The memory 24 stores an ID set in the portable device 3, an ID of the vehicle, information which is necessary to calculate the distance data that is based on the reception intensity of the measurement signal, information regarding an interval between the signals to be transmitted from the portable device 3, or like.

Further, a reception antenna 23 is connected to the portable device reception unit 20. The reception antenna 23 is a triaxial antenna having three-way directional characteristics that are orthogonal to one another, and receives a signal at a first frequency transmitted from the vehicle-side transmission unit 11. The transmission antenna 25 is connected to the portable device transmission unit 21. The transmission antenna 25 is a second transmission antenna, and transmits a signal at a second frequency to the vehicle-side device 2. Here, the second frequency is a frequency (RF) which is higher than the first frequency.

Figure 3:
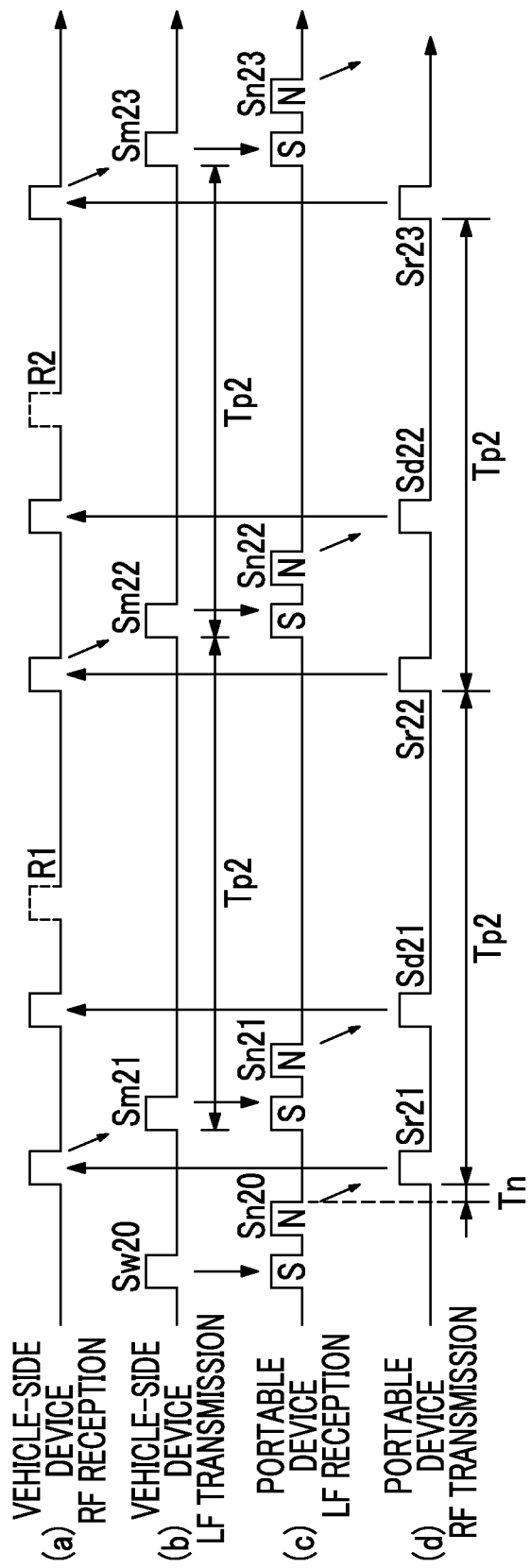
FIG. 3 is a timing chart illustrating timings of transmission and reception of signals in the vehicle-side device and a portable device when the signal intensity information included in noise component data is lower than a threshold value in the embodiment.
Figure 4:
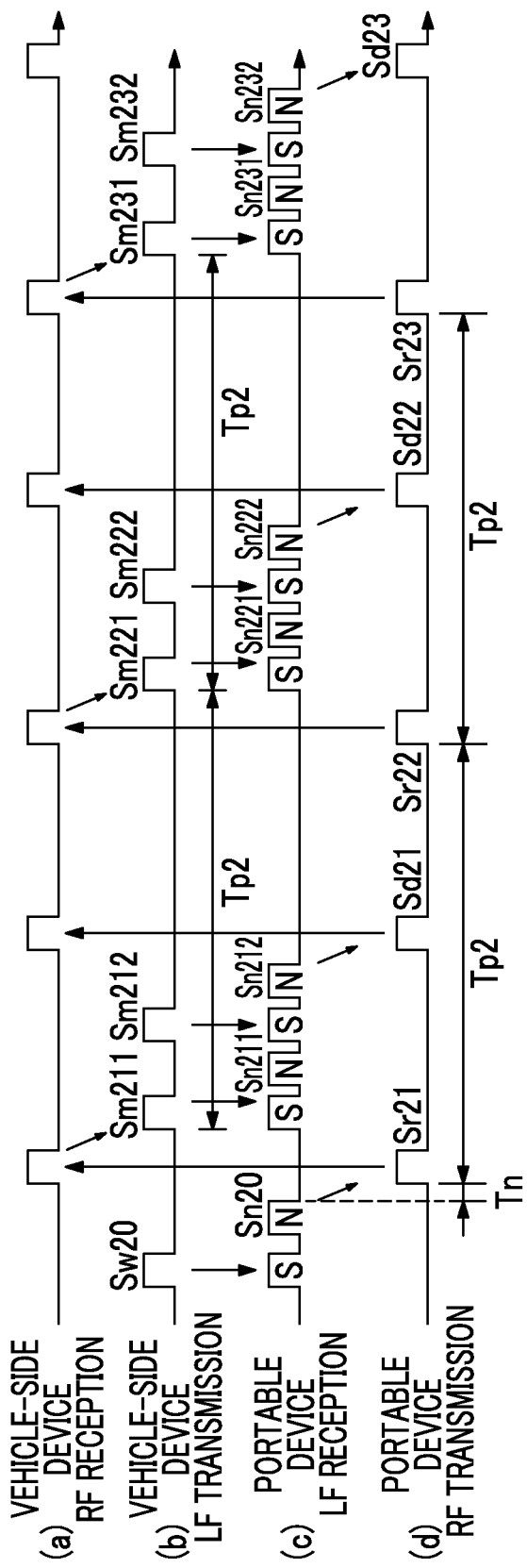
FIG. 4 is a timing chart illustrating timings of transmission and reception of signals in the vehicle-side device and the portable device when the signal intensity information included in the noise component data is equal to or greater than the threshold value in the embodiment.

Subsequently, a flow of communication between the vehicle-side device 2 and the portable device 3 will be described with reference to FIGS. 3 and 4. Here, FIG. 3 is a timing chart illustrating timings of transmission and reception of signals in the vehicle-side device and the portable device when the signal intensity information included in the noise component data is lower than a threshold value in this embodiment. FIG. 4 is a timing chart illustrating timings of transmission and reception of signals in the vehicle-side device and the portable device when the signal intensity information included in the noise component data is equal to or greater than the threshold value in this embodiment. In FIGS. 3 and 4, (a) the signal at the second frequency (RF) received by the vehicle-side device 2, (b) the signal at the first frequency (LF) transmitted by the vehicle-side device 2, (c) the signal at the first frequency (LF) received by the portable device 3, and (d) the signal at the second frequency (RF) transmitted by the portable device 3 are shown sequentially from the top.

While an example in which a request signal requesting to transmit the measurement signal is transmitted from the portable device 3 in the keyless entry device according to this embodiment is shown, the request signal is not transmitted and the vehicle-side device is set to transmit the measurement signal at a predetermined timing. In this case, the vehicle-side device 2 determines whether the signal intensity information included in the noise component data is greater than a predetermined threshold value to determine the number of transmissions of the measurement signal. Further, while the example in which the signal is transmitted from only one of the transmission antennas ANT1 to ANT3 of the vehicle-side device 2 is illustrated in FIGS. 3 and 4, the signal is also sequentially transmitted from the three antennas.

The vehicle-side transmission unit 11 transmits a signal (for example, a start-up signal or a measurement signal) to the portable device 3. The measurement signal is transmitted at a predetermined time period, that is, in each period of time Tp2 illustrated in FIGS. 3 and 4.

The signal such as the start-up signal or the measurement signal transmitted from the vehicle-side device 2, and a signal of the noise component data are included in the signal received by the portable device reception unit 20. Here, the OFF time can be arbitrarily determined according to a specification of the device or the like and is, for example, a time at which a predetermined time elapses after the signal transmitted from the vehicle-side device 2 is received.

A request signal for making a request to transmit the measurement signal, and a signal of the distance data that is based on the reception intensity of the measurement signal transmitted from the vehicle-side device 2 are included in the signal that the portable device transmission unit 21 transmits to the vehicle-side device 2. Further, information regarding the number of transmissions of the measurement signal is included in the request signal. Transmission of the request signal is performed after a predetermined time (time Tn in FIGS. 3 and 4) elapses from reception completion of the signal in the OFF time. The vehicle-side device 2 transmits the measurement signal the requested number of times each time vehicle-side device 2 receives the request signal.

In the triaxial antenna 23, when the intensity of the signal received for one axis of the three axes in the signal of the noise component data is greater than the intensity of a signal of each of the two other axes, and is a predetermined times or more (for example, 10 times or more) the signal intensity of the two other axes, data of the two axes having lower signal intensity is used as the noise component data.

The portable device control unit 22 determines whether the signal intensity information included in the noise component data is equal to or greater than a predetermined threshold value, in addition to the control of the operation of the portable device reception unit 20 and the portable device transmission unit 21, and the calculation of the distance data that is based on the reception intensity of the measurement signal transmitted from the vehicle-side device 2. For the threshold value used for this determination, the portable device 3 is no longer able to determine the start-up signal or the measurement signal when there is a noise component having signal intensity exceeding this threshold value, and the threshold value is a value determined to have a large influence on distance data calculation using the measurement signal. For example, the threshold value is 50% of signal intensity of the start-up signal or the measurement signal.

Further, the determination as to whether the signal intensity information included in the noise component data is equal to or greater than a predetermined threshold value may be performed by the vehicle-side control unit 12. In this case, the signal of the noise component data is transmitted from the portable device 3 to the vehicle-side device 2, and the vehicle-side control unit 12 executes the determination based on this signal.

When the portable device control unit 22 determines that the signal intensity information included in the noise component data is equal to or greater than the predetermined threshold value, the portable device control unit 22 transmits the request signal to request to transmit the measurement signal multiple times during one period of the predetermined time period in the OFF time as illustrated in FIG. 4. This number of transmissions is 2 in the example illustrated in FIGS. 3 and 4, but may be 3 or more. On the other hand, when the portable device control unit 22 determines that the signal intensity information included in the noise component data is lower than the predetermined threshold value, the portable device control unit 22 transmits the request signal to request the measurement signal one time, as illustrated in FIG. 3.

Here, the determination as to whether signal intensity information included in the noise component data is equal to or greater than the predetermined threshold value is performed each time the portable device 3 receives the signal of the noise component data, but the signal intensity of the noise component data may vary in each reception and thus, a determination result may vary. In this case, (1) after a determination result indicating that the signal intensity information included in the noise component data is equal to or greater than the predetermined threshold value is obtained, the measurement signal may be transmitted multiple times always during a predetermined period regardless of a subsequent determination result, (2) a request may be made to transmit the measurement signal multiple times when the signal intensity information included in the noise component data is equal to or greater than the predetermined threshold value in each determination result, and to transmit the time measurement signal one time when the signal intensity information included in the noise component data is lower than the predetermined threshold value.

Next, more specifically, a flow of communication between the vehicle-side device 2 and the portable device 3 will be described with reference to FIGS. 3 and 4.

When the user closes the door 1a, the vehicle-side device 2 transmits a start-up signal Sw20 to the portable device 3 immediately after the closing of the door 1a (for example, after 100 ms).

The portable device 3, which has received the start-up signal Sw20, starts up from a standby state, receives a signal in the OFF time in which the portable device 3 does not perform communication with the vehicle-side device 2 after receiving the start-up signal Sw10, and uses this signal as a signal Sn20 of the noise component data. The portable device 3 determines whether the intensity of the signal Sn20 of the noise component data (signal intensity information included in the noise component data) is equal to or greater than a predetermined threshold value. When the intensity of the signal Sn20 of the noise component data is determined to be lower than the predetermined threshold value, the portable device 3 transmits a request signal Sr21 requesting to transmit one measurement signal Sm21 to the vehicle-side device 2, as illustrated in FIG. 3. On the other hand, when the intensity of the signal Sn20 of the noise component data is determined to be equal to or greater than the predetermined threshold value, the portable device 3 transmits a request signal Sr21 requesting to transmit a plurality of measurement signals Sm211 and Sm212 in the OFF time to the vehicle-side device 2, as illustrated in FIG. 4. The request signal Sr21 is transmitted from the transmission antenna 25 after a certain time Tn elapses from the reception of the signal Sn20 of the noise component data. Further, it is preferable for a signal indicating that the start-up signal Sw20 has been received to be transmitted to the vehicle-side device 2 prior to transmission of the request signal Sr21 since activation of the portable device 3 can be confirmed.

The vehicle-side device 2, which has received the request signal Sr21, transmits the measurement signal to the portable device 3 the number of times requested by the request signal Sr21. That is, the vehicle-side device 2 transmits the measurement signal Sm21 as illustrated in FIG. 3 when transmission of one measurement signal is requested, and transmits the measurement signals Sm211 and Sm212 in the OFF time as illustrated in FIG. 4 when transmission of two measurement signals is requested.

The portable device 3, which has received the measurement signal, receives a signal of the noise component data in the OFF time. That is, the portable device 3 receives a signal Sn21 when the portable device 3 has received one measurement signal Sm21 (FIG. 3), and receives the signals Sn211 and Sn212 in the OFF time when the portable device 3 has received two measurement signals Sm211 and Sm212 (FIG. 4).

Then, in the portable device 3, the portable device control unit 22 calculates the distance between the vehicle-side device 2 and the portable device 3 based on the reception intensity of the measurement signal output from the portable device reception unit 20. The distance is calculated based on a value obtained by correcting the reception intensity of the measurement signal using the signal intensity of the noise component data. Here, in the case illustrated in FIG. 4, the reception intensity of the measurement signal is corrected using a value of the signal having lower signal intensity among the signals Sn211 and Sn212 of the noise component data or an average value of values of the signals. A signal Sd21 of the distance data calculated in this way is transmitted from the transmission antenna 25 to the vehicle-side device 2.

The vehicle-side device 2, which has received the signal Sd21 of the distance data, performs a determination as to whether the vehicle-side control unit 12 locks the door 1a based on the distance data, and outputs a signal corresponding to a result of the determination to the locking unit 32.

Then, the vehicle-side device 2 sequentially transmits measurement signals Sm22, Sm23, ... or Sm221, Sm231, ... to the portable device 3 at a predetermined time period, that is, in each period of time Tp2 from transmission of a first measurement signal Sm21 or Sm211. In the case illustrated in FIG. 4, second measurement signals Sm222, Sm232, ... are transmitted in the OFF time after the measurement signals Sm221, Sm231, .... Each transmission of the measurement signal is executed when there are request signals Sr22, Sr23, ... sent from the portable device 3. Further, the request signals Sr22, Sr23, ... are transmitted at a predetermined time period, that is, in each period of time Tp2 from transmission of a first request signal Sr21, similarly to the measurement signals.

The portable device 3, which has received the measurement signals, receives signals Sn22, Sn23, Sn221, Sn222, Sn231, Sn232, ... of the noise component data in the OFF time after the reception of the respective measurement signals. Further, the portable device 3 calculates respective distances between the vehicle-side device 2 and the portable device 3 based on the reception intensity of the measurement signals, and transmits signals Sd22, Sd23, ... of the calculated distance data to the vehicle-side device 2.

In the above operation, when the distance between the vehicle-side device 2 and the portable device 3 is equal to or greater than the threshold value, or when the vehicle-side device 2 does not receive the request signal, the vehicle-side control unit 12 outputs a signal instructing to lock the door 1a to the locking unit 32, and the locking unit 32 automatically locks the door 1a. Here, the measurement of a time Tc, a time Tp1, or other time is performed by a timer unit included in the portable device control unit 22.

Further, in the case illustrated in FIG. 3, it is preferable for a setting to be performed such that the vehicle-side device 2 can wait for the request signal even at timings corresponding to the transmission of the signals Sd21 and Sd22 of the distance data illustrated in FIG. 4 (R1 and R2 in FIG. 3; timings at which a plurality of measurement signals are received) on the assumption that the request signal requesting to transmit the measurement signal multiple times is not received.

According to the keyless entry device of this embodiment, the following effects are achieved through the configuration as described above.

(1) Since the background noise is measured in the OFF time in which the communication with the vehicle-side device 2 is not performed, and the measurement signal is controlled using the information signal that is based on the noise component data, it is possible to generate and transmit an optimum information signal corresponding to the background noise.

(2) The portable device acquires the reception intensity of the measurement signal, and transmits a signal including any one of calculation data from the data that is based on the reception intensity of the measurement signal and calculation data from data that is based on the reception intensity of the measurement signal and the noise component data, and the vehicle-side device performs predetermined control of the vehicle based on the calculation data. Thus, it is possible to accurately perform predetermined control of the vehicle even when there is background noise.

(3) When the intensity of a signal received for one axis of three axes of the triaxial antenna 23 is greater than and predetermined times or more the intensity of a signal of each of the two other axes at the time of acquisition of the noise component data, signal intensity data of the two axes having lower signal intensity is used as the noise component data. An LF (long wavelength region) noise output from a display screen of a smartphone or the like has a strong tendency to periodically increase in the axis that is in a position parallel to the screen of the smartphone among the three axes of the triaxial antenna 23. Therefore, more average background noise can be measured by using the data of the two axes other than one axis having greater signal intensity, and thus, it is possible to improve the measurement accuracy.

(4) When the signal intensity information included in the noise component data is equal to or greater than the predetermined threshold value, the measurement signal is transmitted multiple times for one determination, or the measurement signal having a larger signal width is transmitted. Further, correspondingly, the number of acquisitions or an acquisition time of noise component data in the OFF time is similarly increased. Thus, even when there is varying noise, including periodically increasing noise such as LF noise generated in a smart phone or the like, it is possible to measure the signal intensity of average noise, and thus, to secure measurement accuracy of the distance data. Further, it is possible to suppress power consumption by performing such a process only when the noise is larger than a threshold value.

(5) When the start-up signal is transmitted immediately after the user closes the door 1a and the request signal is transmitted from the portable device 3 to the vehicle-side device 2 at the predetermined time period after the start-up signal is received, the start-up signal reaches the portable device 3 while the portable device 3 is near the vehicle 1, and thus, it is possible to suppress influence of the noise signal through the information device carried by the user and reliably start up the portable device 3. Further, if the start-up signal is received immediately after the door 1a is closed, it is no longer necessary to receive the start-up signal, and thus, even in an environment in which a noise signal exists, it is possible to reliably perform periodic distance measurement and control.

(6) It is possible to suppress the influence of the noise in a long wavelength region output from the information device by transmitting a signal at a first frequency from the vehicle-side device 2 and transmitting a signal at a second frequency higher than the first frequency from the portable device 3.

Figure 5:
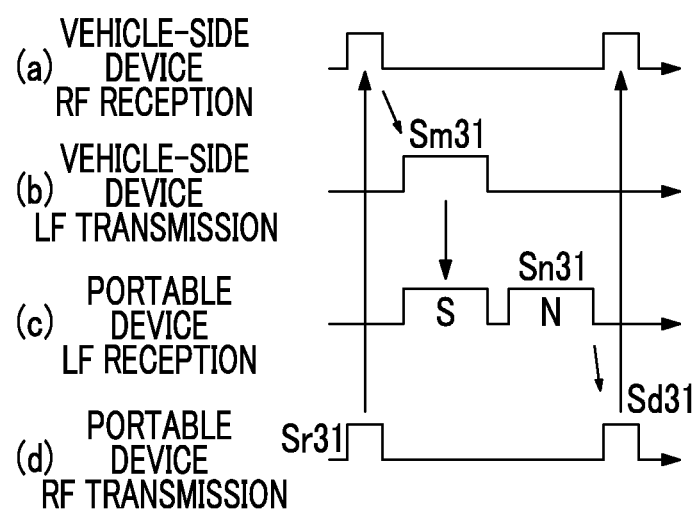
FIG. 5 is a timing chart illustrating a timing of transmission and reception of a signal in the vehicle-side device and the portable device according to a modification example of the embodiment.

Hereinafter, a modification example of this embodiment will be described with reference to FIG. 5. FIG. 5 is a timing chart illustrating a timing of transmission and reception of a signal in the vehicle-side device and a portable device according to the modification example of this embodiment. In FIG. 5, (a) a signal at a second frequency (RF) received by the vehicle-side device 2, (b) a signal at a first frequency (LF) transmitted by the vehicle-side device 2, (c) a signal at the first frequency (LF) received by the portable device 3, and (d) a signal at the second frequency (RF) transmitted by the portable device 3 are shown sequentially from the top.

In the above embodiment, when the signal intensity information included in the noise component data is equal to or greater than the predetermined threshold value, the measurement signal has been transmitted multiple times for one determination. On the other hand, in this modification example, when the signal intensity information included in the noise component data is equal to or greater than the predetermined threshold value, a measurement signal having a larger signal width than when the signal intensity information included in the noise component data is lower than the threshold value is transmitted. More specifically, as illustrated in FIG. 5, a transmission time of the measurement signal Sm31 from the vehicle-side device 2 in response to a request signal Sr31 from the portable device 3 is lengthened relative to the measurement signal in the case illustrated in FIG. 3, that is, a case in which the signal intensity information included in the noise component data is lower than the predetermined threshold value, and correspondingly, a reception time in the portable device 3 is lengthened. This reception time may be, for example, twice as long as the reception time in the case illustrated in FIG. 3. Further, after the measurement signal Sm31 is received, the OFF time in in which a signal Sn31 of the noise component data is received without communication with the vehicle-side device 2 is lengthened to the same extent as the transmission time of the measurement signal Sm31.

Thus, by increasing a transmission and reception time of the measurement signal and a measurement time of the noise component, measurement when signal intensity of noise is low is possible even when there is noise of which signal intensity varies, such as LF noise generated in a smart phone or the like, and thus, it is possible to secure measurement accuracy of the distance data Sd31.

While in the above embodiment, the case in which the request signal is transmitted as the information signal that is based on the noise component data has been described, multiple types of "information signals that are based on the noise component data" may be transmitted. For example, the request signal and another type of "information signal that is based on the noise data component" may be transmitted.

The present invention has been described with reference to the above embodiment, but the present invention is not limited to the above embodiment, and improvements or modifications may occur within the scope of the object of improvement or the spirit of the prevent invention.

As described above, in the keyless entry device according to the present invention, even when the user carries other information devices such as a mobile smart phone, it is possible to perform predetermined control of the vehicle accurately and reliably.

It should be understood by those skilled in the art that various modifications, combinations, sub-combinations and alterations may occur depending on design requirements and other factors insofar as they are within the scope of the appended claims of the equivalents thereof.

What is claimed is:

1. A keyless entry device comprising:
a vehicle-side device provided on a vehicle and configured to transmit signals at a first frequency; and
a portable device to be carried by a user and configured to transmit signals at a second frequency, the vehicle-side device and the portable device performing predetermined control of the vehicle by communicating with each other,
wherein the portable device transmits an information signal based on noise component data which is obtained from a signal intensity of a signal received in an OFF time period during which the portable device does not receive the signals from the vehicle-side device, and wherein the vehicle-side device transmits a measurement signal at a predetermined time interval, the measurement signal being controlled based on the information signal received from the portable device.

2. The keyless entry device according to claim 1, wherein the portable device obtains a reception intensity of the measurement signal, and transmits a signal including calculation data which is calculated from the reception intensity of the measurement signal, or calculated from the reception intensity of the measurement signal and the noise component data, and wherein the vehicle-side device performs the predetermined control of the vehicle based on the calculation data.

3. The keyless entry device according to claim 1, wherein one of the portable device and the vehicle-side device determines whether a noise signal intensity included in the noise component data is equal to or greater than a predetermined threshold value, and when the noise signal intensity is equal to or greater than the predetermined threshold value, the measurement signal is transmitted multiple times within a period of the predetermined interval period.

4. The keyless entry device according to claim 1, wherein one of the portable device and the vehicle-side device determines whether a noise signal intensity included in the noise component data is equal to or greater than a predetermined threshold value, and when the noise signal intensity is equal to or greater than the predetermined threshold value, the measurement signal having a larger signal width is transmitted.

5. The keyless entry device according to claim 1, wherein the portable device includes a triaxial antenna, and wherein if an intensity of a signal received on one axis of the triaxial antenna is predetermined times or more greater than a respective intensity of signals received on the remaining two axes of the triaxial antenna when the noise component data is being obtained, the signal intensity of the two remaining axes is used for the noise component data.

6. The keyless entry device according to claim 1, wherein the information signal includes:

the signal intensity included in the noise component data; or information indicating whether the signal intensity included in the noise component data is equal to or greater than a predetermined threshold value.

7. The keyless entry device according to claim 1, wherein the portable device transmits a request signal to the vehicle-side device as a part or all of the information signal at the predetermined time interval, and wherein the vehicle-side device transmits the measurement signal each time the vehicle-side device receives the request signal.

8. The keyless entry device according to claim 7, wherein the request signal requests the vehicle-side device to transmit the measurement signal multiple times during one period of the predetermined time interval or to transmit the measurement signal having a larger signal width, when a noise signal intensity included in the noise component data is equal to or greater than a predetermined threshold value.

9. The keyless entry device according to claim 1, wherein the first frequency is in a long wavelength region, and the second frequency is in a frequency region higher than that of the first frequency.

* * * * *